（12) United States Patent
Wu et al.

(10) Patent No.: US 11,125,643 B2
(45) Date of Patent: Sep. 21, 2021

(54) SEALING DETECTION METHOD FOR A SEALING STRUCTURE

(71) Applicant: SUZHOU RS TECHNOLOGY CO., LTD., Suzhou (CN)

(72) Inventors: Jiafu Wu, Suzhou (CN); Lei Miao, Suzhou (CN)

(73) Assignee: SUZHOU RS TECHNOLOGY CO., LTD., Suzhou (CN)

( * ) Notice: Subject to any disclaimer, the term of this patent is extended or adjusted under 35 U.S.C. 154(b) by 133 days.

(21) Appl. No.: 16/486,824

(22) PCT Filed: Nov. 10, 2017

(86) PCT No.: PCT/CN2017/110393
§ 371 (c)(1),
(2) Date: Aug. 16, 2019

(87) PCT Pub. No.: WO2019/090664
PCT Pub. Date: May 16, 2019

(65) Prior Publication Data
US 2020/0025642 A1 Jan. 23, 2020

(30) Foreign Application Priority Data

Nov. 7, 2017 (CN) .......................... 201711082145.0

(51) Int. Cl.
*G01M 3/26* (2006.01)
*G01M 3/02* (2006.01)
(52) U.S. Cl.
CPC .............. *G01M 3/26* (2013.01); *G01M 3/022* (2013.01)

(58) Field of Classification Search
CPC ........ G01M 3/2869; G01M 3/12; G01M 3/26; G01M 3/366; G01M 3/02
USPC ..................................................... 73/40–49.8
See application file for complete search history.

(56) References Cited

U.S. PATENT DOCUMENTS

| 3,043,129 | A | * | 7/1962 | King | .................... | G01M 3/04 |
| | | | | | | 73/40 |
| 3,047,993 | A | * | 8/1962 | Robbins | ................ | B01D 46/10 |
| | | | | | | 96/134 |
| 3,203,229 | A | * | 8/1965 | Pevar | .................... | G01M 3/12 |
| | | | | | | 73/40 |

(Continued)

FOREIGN PATENT DOCUMENTS

JP           57194328  A  *  2/1998  ............ G01M 3/225

*Primary Examiner* — David A. Rogers
(74) *Attorney, Agent, or Firm* — Platinum Intellectual Property LLP

(57) ABSTRACT

There is provided a sealing detection method for a sealing structure, comprising the following steps: S1, attaching a thin film on a gasket to seal an opening; S2, disposing a sealing ring directly below the base to seal a lower opening of the mounting through hole; S3, providing a vent hole on sealing ring through which the sealing ring communicates with a gas source with a gas pressure sensor; S4, starting to supply or pump gas to form a positive pressure or a negative pressure region between the sealing ring and the base; S5, maintaining the air pressure state for a certain time, during which the gas pressure sensor performs real-time detection of gas flow; S6, comparing detected gas flow with qualified threshold range; S7, sorting products with the sealing structure according to detection results; S8, peeling off the thin film and completing the detection.

3 Claims, 1 Drawing Sheet

(56) References Cited

U.S. PATENT DOCUMENTS

| | | | | |
|---|---|---|---|---|
| 3,807,219 A * | 4/1974 | Wallskog | G01M 3/26 | 73/40 |
| 3,834,346 A * | 9/1974 | Cowan | G01L 19/12 | 116/270 |
| 4,002,055 A * | 1/1977 | Kops | G01M 3/145 | 73/40 |
| 4,238,953 A * | 12/1980 | Laverman | B65D 88/50 | 73/40.7 |
| 4,976,136 A * | 12/1990 | Willan | G01M 3/20 | 73/40.7 |
| 5,182,941 A * | 2/1993 | Frenkel | G01M 3/12 | 73/40 |
| 5,257,088 A * | 10/1993 | Tyson, II | G01B 11/161 | 244/125 |
| 5,404,747 A * | 4/1995 | Johnston | G01M 3/24 | 73/40 |
| 5,559,282 A * | 9/1996 | Knight | G01M 3/12 | 73/38 |
| 6,050,133 A * | 4/2000 | Achter | A61L 2/28 | 73/40.7 |
| 6,289,722 B1 * | 9/2001 | Lycan | G01M 3/025 | 73/40.7 |
| 6,393,896 B1 * | 5/2002 | Fan | G01M 3/3281 | 73/40 |
| 6,463,791 B1 * | 10/2002 | Berube | G01M 3/2884 | 73/46 |
| 6,615,642 B2 * | 9/2003 | Poblete | G01M 3/2869 | 73/37 |
| 6,647,763 B1 * | 11/2003 | Smith | G01M 3/143 | 73/46 |
| 6,823,719 B2 * | 11/2004 | Poblete | G01M 3/32 | 73/37 |
| 8,122,776 B2 * | 2/2012 | Fox | G01M 3/26 | 73/862.581 |
| 9,869,627 B2 * | 1/2018 | Claudon | G01M 13/005 | |
| 10,088,383 B2 * | 10/2018 | Marino | G01M 3/226 | |
| 2002/0112527 A1 * | 8/2002 | Nadin | B64F 5/60 | 73/49.2 |
| 2008/0163675 A1 * | 7/2008 | Hsu | G01M 3/2869 | 73/40 |
| 2011/0174060 A1 * | 7/2011 | Guazzo | G01M 3/3281 | 73/40.7 |
| 2019/0339157 A1 * | 11/2019 | Stauffer | G01M 3/3209 | |
| 2020/0025642 A1 * | 1/2020 | Wu | G01M 3/3209 | |

* cited by examiner

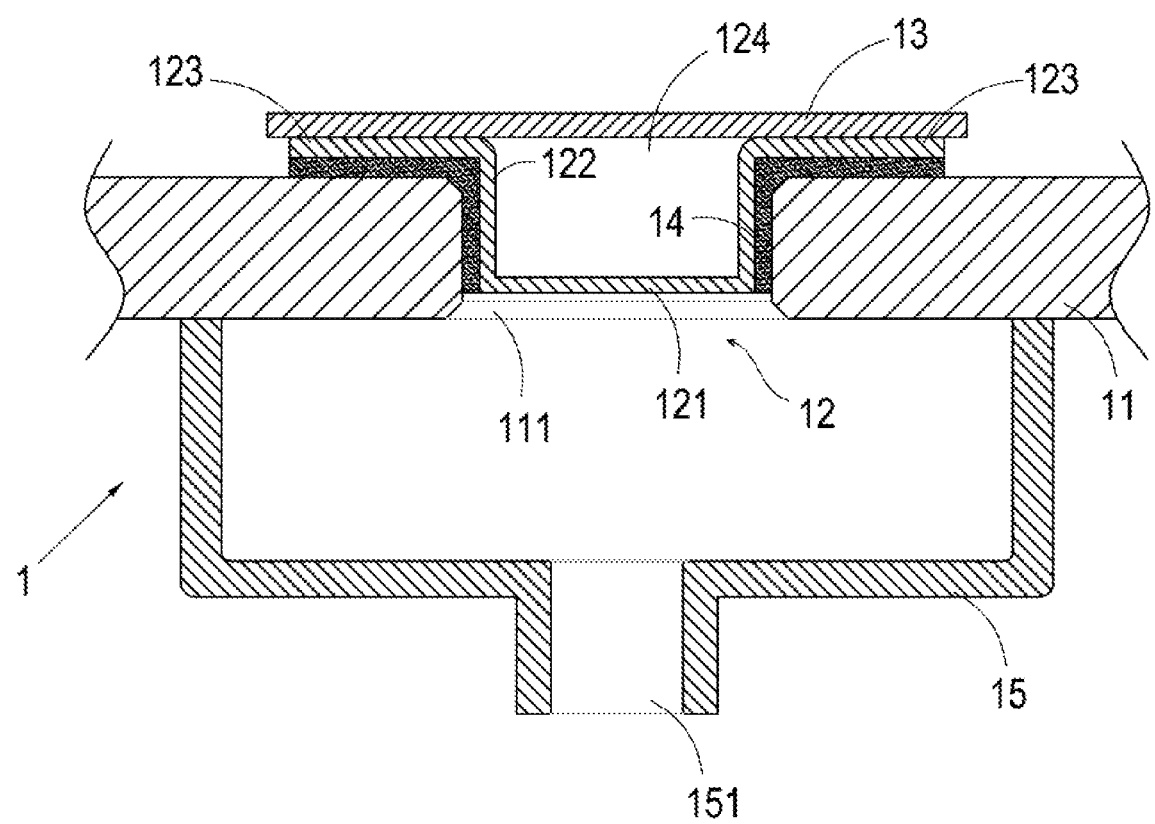

SEALING DETECTION METHOD FOR A SEALING STRUCTURE

TECHNICAL FIELD

The present invention relates to the field of sealing detections, and more particularly to a sealing detection method for a sealing structure.

BACKGROUND

There is often provided a sealing layer between a base provided with a cavity or a through hole and a component mounted in the cavity or the through hole. In order to detect the sealability of their combination, it is common to perform sealing detection by sealing the hole in the component using down-press method on one side of the cavity or the hole while pumping a negative pressure on the other side of the cavity or the hole. In the conventional detection method, a gap between the component and the base is reduced due to the down-press pressure, and the sealability between the two is improved after the gap is reduced. However, this will lead to a missed detection of products actually having problems of poor sealing, which greatly reduces detection success rate and detection accuracy. In view of this, it is necessary to develop a sealing detection method for a sealing structure to solve the above problems.

SUMMARY

In view of the deficiencies in the related art, it is an object of the present invention to provide a sealing detection method for a sealing structure, which can improve sealing detection accuracy and sealing detection success rate, thereby avoiding missed detection or false detection.

To achieve the above mentioned object and other advantages of the present invention, there is provided a sealing detection method for a sealing structure, the sealing structure comprising:

a base, which comprises a mounting through hole formed therein; and a gasket which is disposed in the mounting through hole, wherein an opening is provided at the upper portion of the gasket, the edge of the opening is integrally formed with a skirt portion extending outward, and sealing layers are formed between the gasket and the mounting through hole, and between the skirt portion and the base;

the sealing detection method for the sealing structure comprises the following steps:

S1, attaching a thin film on the gasket to seal the opening;

S2, disposing a sealing ring directly below the base to seal a lower opening of the mounting through hole;

S3, providing a vent hole on the sealing ring through which the sealing ring communicates with a gas source with a gas pressure sensor;

S4, starting to supply or pump gas by the gas source into the sealing ring through the vent hole to form a positive pressure or a negative pressure region between the sealing ring and the base;

S5, maintaining the air pressure state for a certain time, during which the gas pressure sensor performs real-time detection of gas flow;

S6, comparing detected gas flow with a qualified threshold range, when the gas flow is within or less than the qualified threshold range, the sealability of the sealing structure meets the design requirements; otherwise, the sealability of the sealing structure does not meet the design requirements;

S7, sorting products with the sealing structure according to detection results;

S8, peeling off the thin film and completing the detection.

Preferably, in the step S3, the gas source is an industrial gas source or an air gas source.

Preferably, in the step S4, the sealing detection method further comprises performing steady flow regulation of the gas source before starting to pump gas by the gas source.

Preferably, the sealing layer is an adhesive layer filled with an adhesive.

The present invention comprises at least the following beneficial effects compared to the related art: when the sealing method of the opening is changed from a down-press type to a thin film attaching type, the gap between the gasket and the mounting through hole and the gap between the skirt portion and the base are prevented from being narrowed and thinned after being pressed. Therefore, the sealability of these gaps is prevented from being improved due to narrowing and thinning, and a missed detection of products actually having problems of poor sealing is further avoided, thereby greatly improving the detection success rate and detection accuracy.

BRIEF DESCRIPTION OF THE DRAWINGS

FIG. 1 is a longitudinal sectional view of a sealing structure according to one embodiment of the present invention.

DETAILED DESCRIPTION OF EMBODIMENTS

The present invention will be described in further detail with reference to the accompanying drawings below. The foregoing and other objects, features, aspects and advantages of the present invention will become more apparent, in order to enable person skilled in the art to practice with reference to the description. In the Figures, shapes and dimensions can be enlarged for clarity, and same or similar elements are indicated by same reference numerals throughout the Figures. In the following description, terms such as center, thickness, height, length, front, back, rear, left, right, top, bottom, upper, lower, etc. are based on the orientation or positional relationship shown in the drawings. In particular, "height" corresponds to the size from top to bottom, "width" corresponds to the size from left to right, and "depth" corresponds to the size from front to rear. These relative terms are for convenience of description and are generally not intended to require a particular orientation. Terms relating to attachment, coupling, etc. (e.g., "connected" and "attached") refer to a relationship in which these structures are directly or indirectly fixed or attached to each other through an intermediate structure, as well as a movable or rigid attachment or relationship, unless otherwise explicitly stated.

As shown in FIG. 1, a sealing structure 1, comprises:

a base 11 which comprises a mounting through hole 111 formed therein; and a gasket 12 which is disposed in the mounting through hole 111, wherein an opening 124 is provided at the upper portion of the gasket 12, the edge of the opening 124 is integrally formed with a skirt portion 123 extending outward, and sealing layers 14 are formed between the gasket 12 and the mounting through hole 111, and between the skirt portion 123 and the base 11. In a preferred embodiment, the gasket 12 comprises a side wall 122 and a bottom wall 121, the side wall 122 is integrally joined to the bottom wall 121 on the outer circumference of the bottom wall 121 and extends upward from the outer circumference of the bottom wall 121, and the skirt portion 123 is joined to the outer side of a top of the side wall 122.

Usually, a plurality of elements or components are mounted on the bottom wall 121, and the mounted elements or components may cause a plurality of holes to be formed on the bottom wall 121, which pass through the bottom and top of the bottom wall 121. In order to detect the sealability between the gasket 12 and the mounting through hole 111 and between the skirt portion 123 and the base 11, the opening 124 needs to be closed and sealed. The conventional method is to close the opening 124 with a sealing ring and apply a certain pressure downward to form a seal. While applying pressure, the gap between the gasket 12 and the mounting through hole 111 and the gap between the skirt portion 123 and the base 11 are reduced due to the down-press pressure. Therefore, the sealability of the gap is improved after the gap is reduced. However, this will lead to a missed detection of products actually having problems of poor sealing, which greatly reduces detection success rate and detection accuracy.

In view of this, the present invention provides a sealing detection method for a sealing structure comprising the following steps:

S1, attaching a thin film 13 on the gasket 12 to seal the opening 124;

S2, disposing a sealing ring 15 directly below the base 11 to seal a lower opening of the mounting through hole 111;

S3, providing a vent hole 151 on the sealing ring 15 through which the sealing ring 15 communicates with a gas source with a gas pressure sensor;

S4, starting to supply or pump gas by the gas source into the sealing ring 15 through the vent hole 151 to form a positive pressure or a negative pressure region between the sealing ring 15 and the base 11;

S5, maintaining the air pressure state for a certain time, during which the gas pressure sensor performs real-time detection of gas flow;

S6, comparing detected gas flow with a qualified threshold range, when the gas flow is within or less than the qualified threshold range, the sealability of the sealing structure meets the design requirements; otherwise, the sealability of the sealing structure does not meet the design requirements;

S7, sorting products with the sealing structure according to detection results;

S8, peeling off the thin film 13 and completing the detection.

Preferably, in the step S3, the gas source is an industrial gas source or an air gas source.

Preferably, the sealing detection method further comprises performing steady flow regulation of the gas source before starting to pump gas by the gas source.

Preferably, the sealing layer 14 is an adhesive layer filled with an adhesive.

The sealing method of the opening 124 according to the present invention is changed from a down-press type to a thin film attaching type, the gap between the gasket 12 and the mounting through hole 111 and the gap between the skirt portion 123 and the base 11 are prevented from being narrowed and thinned after being pressed. Therefore, the sealability of these gaps is prevented from being improved due to narrowing and thinning, and a missed detection of products actually having problems of poor sealing is further avoided, thereby greatly improving the detection success rate and detection accuracy and meeting the actual detection needs.

The number of devices and processing scales described herein are intended to simplify the description of the present invention. Applicability, modifications, and variations of the present invention will be apparent to the person skilled in the art.

Although embodiments of the present invention have been disclosed as above, they are not limited to the implementations listed in the specification and embodiments. They can be applied to all kinds of fields suitable for the present invention. Additional modifications can be easily implemented to those who are familiar with the field. Therefore, the present invention is not limited to specific details and the legends shown and described herein without deviation from the general concepts defined in the claims and the equivalents thereof.

What is claimed is:

1. A sealing detection method for a sealing structure, the sealing structure comprising:
   a base, which comprises a mounting through hole formed therein; and
   a gasket which is disposed in the mounting through hole, wherein an opening is provided at the upper portion of the gasket, the edge of the opening is integrally formed with a skirt portion extending outward, and sealing layers are formed between the gasket and the mounting through hole, and between the skirt portion and the base;
   being characterized in that, the sealing detection method for the sealing structure comprises the following steps:
   S1, attaching a film on the gasket to seal the opening, wherein the film is not in contact with a surface of the base;
   S2, disposing a sealing ring directly below the base to seal a lower opening of the mounting through hole;
   S3, providing a vent hole on the sealing ring through which the sealing ring communicates with a gas source with a gas pressure sensor;
   S4, conducting steady flow regulation of the gas source, starting to supply or pump gas by the gas source into the sealing ring through the vent hole to form a positive pressure or a negative pressure region between the sealing ring and the base;
   S5, maintaining the air pressure state for a certain time, during which the gas pressure sensor performs real-time detection of gas flow;
   S6, comparing detected gas flow with a qualified threshold range, when the gas flow is within or less than the qualified threshold range, the sealability of the sealing structure meets the design requirements; otherwise, the sealability of the sealing structure does not meet the design requirements;
   S7, sorting products with the sealing structure according to detection results; and
   S8, peeling off the film and completing the detection.

2. The sealing detection method for a sealing structure according to claim 1, being characterized in that, in the step S3, the gas source is an industrial gas source or an air gas source.

3. The sealing detection method for a sealing structure according to claim 1, being characterized in that, the sealing layer is an adhesive layer filled with an adhesive.

* * * * *